Figure 1:
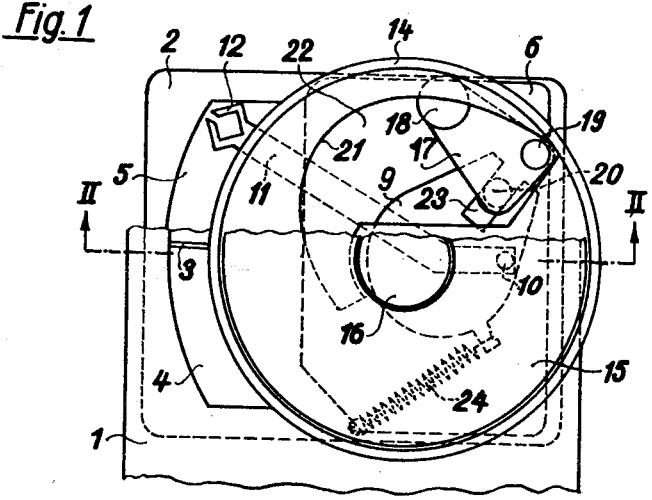

Dec. 25, 1962　　　A. WINKLER ETAL　　　3,069,969
POINTER SETTING DEVICE FOR METERS
Filed March 27, 1958

INVENTORS
Alfred Winkler, Erwin Becker
BY
Michael S. Striker
Attorney

United States Patent Office 3,069,969
Patented Dec. 25, 1962

3,069,969
POINTER SETTING DEVICE FOR METERS
Alfred Winkler and Erwin Becker, Munich, Germany, assignors to Firma Agfa Aktiengesellschaft, Leverkusen-Bayerwerk, Germany
Filed Mar. 27, 1958, Ser. No. 724,305
Claims priority, application Germany Apr. 6, 1957
5 Claims. (Cl. 88—23)

The present invention relates to meters such as exposure meters used in photography.

Wtih meters of this type, there are generally a pair of pointers, one of which is moved by the instrument of the meter, such as the galvanometer thereof, and the other of which is manually moved to a position aligned with the first pointer in order to give the desired information. For purposes of accuracy the movement of the manually movable pointer is conventionally controlled by a fairly long camming surface, and this surface is made quite long so that a high degree of accuracy may be maintained. However, this construction results in a fairly large meter, so that it is difficult to make such meters in small sizes, and this fact is of particular disadvantage in those cases where it is desired to mount the meter directly on a camera so as to form a part of the camera.

One of the objects of the present invention is to provide a meter of the above type which, on the one hand, can be made of a much smaller size than conventional meters so that it can easily be incorporated into a camera, and which, on the other hand, is just as accurate as conventional larger meters.

Another object of the present invention is to provide in a meter of the above type, between a manually movable member and a pointer, a transmission which is made up of a relatively small number of small parts, which can be constructed with a high degree of accuracy and which cooperate together to move the pointer properly.

A further object of the present invention is to provide in a meter of the above type, between a pointer and a manually movable member, a transmission which includes a camming surface curved in such a way that even though it is relatively short it is nevertheless capable of providing the required accuracy in the position of the pointer.

An additional object of the present invention is to provide a structure capable of accomplishing all of the above objects and at the same time composed of simple and ruggedly constructed elements which are very reliable in operation.

With the above objects in view, the present invention includes in a meter such as an exposure meter a support means and a pointer movably supported by the support means as well as a manually engageable member accessible to the operator and also movably supported by the support means. In accordance with the present invention, there is located between the pointer and manually engageable member a transmission for moving the pointer upon movement of the manually engageable member, and this transmission includes a lever located between the pointer and the manually engageable member and supported by the support means for turning movement about an axis which remains stationary with respect to the support means.

Figure 2:
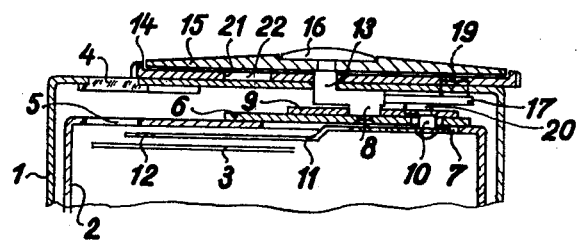

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary illustration of a meter constructed according to present invention in top plan view; and FIG. 2 is a fragmentary sectional elevational view taken along the line II—II of FIG. 1 in the direction of the arrows.

Referring now to the drawings, there is shown therein a cover plate 1 of a camera, this cover plate 1 being fragmentarily illustrated. Beneath this cover 1 there is located a housing 2 and a photoelectric exposure meter whose measuring instrument is not illustrated. The fragmentarily illustrated galvanometer pointer 3 of the meter is visible through the aligned windows 4 and 5 of the cover member 1 and the housing 2, respectively.

The parts 1 and 2 form part of the support means for the structure of the invention, and this support means further includes a mounting plate 6 fixedly carried by the housing 2 at the upper surface thereof, as viewed in FIG. 2. This mounting plate 6, in accordance with the present invention, carries the entire transmission of the present invention. The top wall of the housing 2 on which the plate 6 is mounted is formed with a cutout 7 which is covered by the plate 6. A pivot pin portion 8 is fixedly connected to and extends upward from the plate 6 and a lever 9 is turntable about the pivot pin portion 8 and is located directly on the mounting plate 6. This lever 9 fixedly carries a pin 10 which extends through an elongated slot of the plate 6 into the cutout 7, and this pin 10 fixedly carries the pointer 11 which is to be aligned with the pointer 3 during use of the meter. It will be noted from FIG. 1 that the fixing of the pointer 11 to the lever 9 by the pin 10 causes the pointer 11 to turn together with the lever 9 about the axis of the pivot pin portion 8 and the pointer 3 is also turnable about this axis. The pointer 11 is located in the interior of the housing 2 of the measuring instrument. The free indicating end portion of the pointer 11 is also visible through the windows 4 and 5 and is in the form of a hollow rhombus 12 one corner of which is open, as is particularly evident from FIG. 1. With this construction, it is possible to align the pointer 11 with the pointer 3 with a high degree of accuracy by locating the open corner of the hollow rhombus directly over the pointer 3.

The structure of the invention includes a second pivot pin portion 13 and, in accordance with the present invention, this second pivot pin portion 13 is integral with the pivot pin portion 8 and is offset therefrom. This pivot pin portion 13 extends through the camera cover member 1 to the exterior of the latter and guides for turning movement a manually engageable member in the form of a knurled disc 14 and a circular disc 15 which carries different scales. A screw member 16 is threaded into the top end of the pivot pin portion 13 and serves to retain the discs 14 and 15 in operative connections with the pivot pin portion 13.

A transmission means according to the present invention serves to transmit the manual turning of the member 14 to the pointer 11 for positioning the meter. This transmission means includes, in accordance with the present invention, a lever 17 which is turnable about a pivot pin 18 fixedly carried by the mounting plate 6, so that the lever 17 is turnable about an axis which remains stationary with respect to the support means 1, 2 and 6. It will be noted that this lever 17 is located between the member 14 and the disc 9. The lever 17 fixedly carries on its top face, as viewed in FIGS. 1 and 2, a motion transmitting element in the form of a pin 19 and at its bottom downward directed face lever 17 fixedly carries a pin 20 which is displaced from the pin 19.

The transmission means of the present invention includes a camming surface 21 of a predetermined curvature which engages the pin 19. This camming surface 21 is turnable together with the disc 14 and cooperates with the pin 19 to turn the lever 17 when the disc 14 is manually turned. In the illustrated example, the disc 14 is formed with a cutout 22 one edge of which forms the camming surface 21. The lever 17 is operatively connected with lever 9 through a pin-and-slot connection, the pin of which is formed by the pin 20. The lever 9 is formed with an elongated slot 23 into which the pin 20 extends so that, in this way, the turning of the lever 17 about the axis of the pin 18 is transmitted to the lever 9 and in turn to the pointer 11 which turns together with the lever 9. A coil spring 24 is fixed at one end to the mounting plate 6 and at its opposite end to a projection integral with and extending from the lever 9 so that the lever 9 is urged by the coil spring 24 in a clockwise direction, as viewed in FIG. 1, and in this way the pin 19 is maintained at all times in engagement with the camming surface 21.

The lever 9 together with its slot 23, the lever 17 with its pins 19 and 20, as well as the disc 14 with its camming surface 21 cooperate together to form a linearizing drive, which, in spite of non-linear characteristics of the galvanometer, permit the graduations of the light values to be spaced equidistantly from each other in a scale on the disc 15, and the graduations of any other scales on the disc 15 can be spaced equally from each other with the transmission of the invention even though the pointer 3 of the meter is not moved according to a linear characteristic.

Of course, instead of a cutout 22, as shown in FIG. 1, the disc 14 may be provided with an elongated slot having the curvature of the camming surface 21 and in which the pin 19 is located. Also, other types of camming surfaces may be provided. For example, the camming surface may form part on an element separate from the disc 14 and arranged between the latter and the pointer 11.

With the structure of the invention, it is possible, without sacrificing accuracy, to make the motion transmitting elements located between the camming surface and the pointer of a small size, which is of particular significance for an instrument which is to be incorporated into a camera, for example.

It will be understood that each of the elements described above, or two or more together, may also find a useful application in other types of meters differing from the types described above.

While the invention has been illustrated and described as embodied in exposure meters, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a meter such as an exposure meter, in combination, support means; a first pivot pin fixedly carried by said support means; a manually engageable member turnably supported by said first pivot pin, said member having a camming surface of predetermined curvature which turns with said member about said first pivot pin; a second pivot pin fixedly carried by said support means; a first lever turnable about said second pivot pin; a pointer fixed to said first lever for turning movement therewith about said second pivot pin; a second lever turnably supported by said support means and located between said first lever and said manually engageable member; a motion transmitting element carried by said second lever and engaging said camming surface so that said second lever is turned upon turning of said manually engageable member, one of said levers being formed with a slot; and a pin fixedly connected to the other of said levers and projecting through said slot for interconnecting said second lever with said first lever for turning the latter together with said pointer about the axis of said second pivot pin during turning of said second lever.

2. In a meter such as an exposure meter, in combination, support means; a first pivot pin fixedly carried by said support means; a manually engageable member turnably supported by said first pivot pin, said member having a camming surface of predetermined curvature which turns with said member about said first pivot pin; a second pivot pin fixedly carried by said support means; a first lever turnable about said second pivot pin; a pointer fixed to said first lever for turning movement therewith about said second pivot pin; a second lever turnably supported by said support means for turning movement about an axis spaced from said pivot pins, said second lever being located between said first lever and said manually engageable member; a motion transmitting element carried by said second lever and engaging said camming surface so that said second lever is turned upon turning of said manually engageable member, one of said levers being formed with a slot; a pin fixedly connected to the other of said levers and projecting through said slot for interconnecting said second lever with said first lever for turning the latter together with said pointer about the axis of said second pivot pin during turning of said second lever; and spring means cooperating with said first lever for urging the latter to turn in a direction which maintains said element in operative engagement with said camming surface.

3. In a meter such as an exposure meter, in combination, support means; a first pivot pin fixedly carried by said support means; a manually engageable member turnably supported by said first pivot pin, said member having a camming surface of predetermined curvature which turns with said member about said first pivot pin; a second pivot pin fixedly carried by said support means, said second pivot pin being integral with and offset from said first pivot pin; a first lever turnable about said second pivot pin; a pointer fixed to said first lever for turning movement therewith about said second pivot pin; a second lever turnably supported by said support means for turning movement about an axis spaced from said pivot pins, said second lever being located between said first lever and said manually engageable member; a motion transmitting element carried by said second lever and engaging said camming surface so that said second lever is turned upon turning of said manually engageable member, one of said levers being formed with a slot; and a pin fixedly connected to the other of said levers and projecting through said slot for interconnecting said second lever with said first lever for turning the latter together with said pointer about the axis of said second pivot pin during turning of said second lever.

4. In a meter such as an exposure meter, in combination, support means; a manually engageable member; a pointer member, each of said members being supported on said support means turnable about a pivot axis differing from the pivot axis of the other member; a lever supported by said support means turnable about a pivot axis spaced from the pivot axes of said members; first cam means for transmitting turning movement of said manually engageable member to said lever at a first varying transmission rate constantly increasing during turning of said manually engageable member in one direction and constantly decreasing during turning of said manually engageable member in a direction opposite to said one direction, said manually engageable member turning said lever about its pivot axis in a first direction when said manually engageable member is turned in said one direction and said lever is turned in a second direction during turning of said manually engageable member in said opposite direction; and second cam means for transmitting turning movement of said lever to said pointer at a second varying transmission rate constantly increasing when said lever is turned in said first direction and constantly decreasing when said lever is turned in said second direction, whereby said two cam means co-operate together due to the combination of their individual varying transmission rates, so that said first varying transmission rate of said first cam means is further increased by said second varying transmission rate of said second cam means so as to provide for a rapidly increasing or decreasing change of rate of the turning movement of said pointer during turning of said manually engageable member in said one or the other direction.

5. A meter as defined in claim 4 in which said manually engageable member is in the form of a disc, in which said first cam means is formed in said disc, and in which said disc, said lever and said second cam means are arranged adjacent each other superimposed in substantially parallel planes with the periphery of said disc located beyond any portions of said lever and said second cam means in all positions of these elements with respect to each other.

References Cited in the file of this patent

UNITED STATES PATENTS

| | | |
|---|---|---|
| 2,252,573 | Leitz et al. | Aug. 12, 1941 |
| 2,648,254 | Stimson et al. | Aug. 11, 1953 |

FOREIGN PATENTS

| | | |
|---|---|---|
| 458,546 | Great Britain | Dec. 22, 1936 |
| 625,988 | Great Britain | July 7, 1949 |
| 705,855 | Great Britain | Mar. 17, 1954 |
| 946,852 | Germany | Aug. 9, 1956 |